Feb. 3, 1925.
R. DE BARTOLOMEIS ET AL
1,524,784
PROCESS FOR THE DISTILLATION OF SOLID FUEL
Filed Aug. 31, 1920
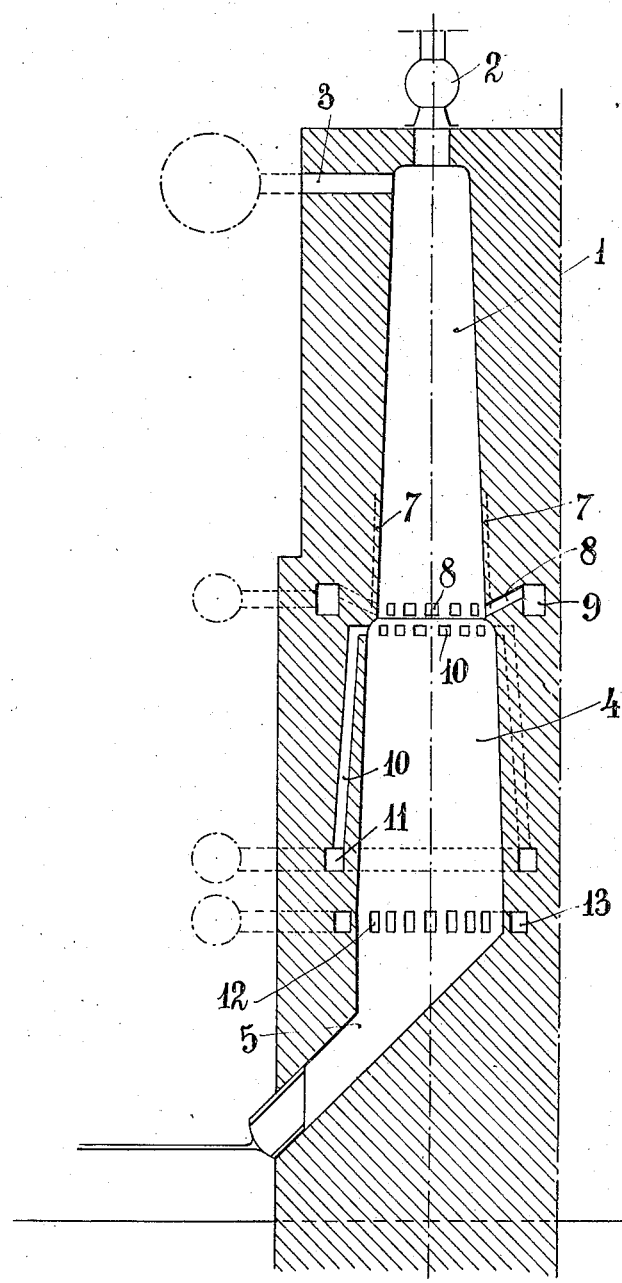
Inventors:
Remo De Bartolomeis
and Romolo De Bartolomeis
By Lawrence Langner
Attorney.

Patented Feb. 3, 1925.

1,524,784

UNITED STATES PATENT OFFICE.

REMO DE BARTOLOMEIS AND ROMOLO DE BARTOLOMEIS, OF MILAN, ITALY, ASSIGNORS TO SOCIETA ANONIMA FORNI ED IMPIANTI INDUSTRIALI, OF MILAN, ITALY, A COMPANY OF ITALY.

PROCESS FOR THE DISTILLATION OF SOLID FUEL.

Application filed August 31, 1920. Serial No. 407,233.

*To all whom it may concern:*

Be it known that we, REMO DE BARTOLOMEIS and ROMOLO DE BARTOLOMEIS, subjects of the King of Italy, and residents of Milan, Italy, have invented certain new and useful Processes for the Distillation of Solid Fuel, of which the following is a specification.

This invention relates to a process of distillation of fuels such as coal, lignite, turf, wood, etc., to obtain therefrom gases of different qualities with limited consumption of fuel.

The process in accordance with the invention consists in causing the mass of fuel to be distilled, while it is descending in a retort in the form of a vertical shaft, to be traversed by a current of gas substantially free from oxygen (hereinafter referred to as inert gas), mixed or not with steam, which is heated in passing upwards through the mass of solid and incandescent coke residue of distillation which is collected in the lower portion of the retort. This scrubbing of the whole mass by means of a current of inert gases is associated with a supply of heat to the mass of the fuel to be distilled, this supply of heat being effected within a limited zone which is the heating zone of the retort and within the region in which the distillation of the fuel is complete or practically complete, and there remains only the solid incandescent residue. For the inert gas there may be employed the gas produced by the retort.

The supply of heat to the mass of fuel to be distilled is effected by the introduction into the said heating zone of the retort of a limited quantity of air, first heated if desired, so as to burn a part of the fuel or the gases traversing the retort. The combustion gases are added to the inert gases, and traverse the fuel, imparting to the fuel their heat.

An electric circuit installed in the walls of the retort within the heating zone may also be availed of to supply heat.

In the heating zone of the retort may be injected liquid hydrocarbons (tars, heavy oils, naphtha, etc.) which distil and produce permanent gases forming an addition to the distillation gases of the mass of fuel.

A retort adapted for the performance of this process is constituted by a vertical shaft with superposed frusto-conical sections and comprising means for effecting the supply of heat to the heating zone according to one or more of the methods mentioned as well as the introduction of inert gases, hydrocarbons, or the like, and the discharge of the volatile products and of the coke.

The figure of the annexed drawing is an elevation in section of an embodiment of the retort used in the process according to the present invention, the same being given merely by way of example.

In the construction shown, the retort comprises an upper chamber 1 having a sectional area increasing downwardly and constituting the distillation chamber in which is charged the fuel to be treated which is introduced from above through a sealing charging hopper indicated diagrammatically at 2; the gases which are given off in this chamber are discharged through the passage 3.

To the base of the chamber 1 is connected another chamber 4, also frusto-conical, having at its upper end a greater sectional area than the base of the chamber 1 for the purpose of producing a stirring action in the descending material and consequently of increasing the permeability of the mass. The chamber 4 terminates in a lower passage 5 provided with a hopper or other suitable arrangement for the continuous or intermittent discharge of the materials.

In the lower zone of the chamber 1 which is the heating zone are provided the electric heating means indicated diagrammatically at 7, and into the base of the chamber open passages 8 connected with an annular channel 9 to which may be supplied the combustible gases or, if desired, the gases produced by the retort which are heated to an elevated temperature outside of the retort. Through the passages 8 may be injected into the retort liquid hydrocarbons suitably atomized either alone or mixed with warm gases or with air which may be used to atomize the hydrocarbon. Into a lower zone open passages 10 which preferably extend longitudinally of the wall of the chamber 4 and connect with an annular channel 11.

Into the channel 11 may be introduced combustion air which is preliminarily heated by the walls of said channel which are heated by the incandescent material existing in the chamber 4.

Finally, into the lower part of the chamber 4 open passages 12 communicating with the channel 13 to which may be supplied inert combustible gas.

The heat necessary for the distillation of the solid fuel which is charged into the chamber 1 may thus be supplied by the electric resistances 7 or by causing a portion of the fuel itself to burn by introducing through the passages 10 air heated or not.

In all cases to recover the heat of the solid residues descending in the chamber 4 there is introduced through the passages 12 combustible gases free from oxygen, generally the gas produced by the retort and purified.

This gaseous material is heated in contact with the incandescent residues in the chamber 4 and contributes to the heating of the chamber 1.

What we claim as our invention and desire to secure by United States Letters Patent is:—

1. A method of distillation of solid fuels for generating gases, comprising causing a fuel charge to descend in the form of a column, maintaining a portion of this column intermediate its ends at the temperature of distillation of said fuel, introducing at the bottom of said column a combustible gas incapable of producing a substantial amount of oxidation with the fuel descending from the distillation zone, for carrying up the heat of said fuel, said gas being introduced at the ambient temperature, and introducing in a continuous and adjustable manner a combustion supporting gas in the distillation zone of said column, substantially at the point where the distillation is substantially completed, for producing therein a partial combustion and for raising the temperature to the value required for the distillation of said fuel.

2. A method of distillation of solid fuels for generating gases, comprising causing a fuel charge to descend in the form of a column having a cross section increasing from top to bottom, maintaining an intermediate portion of the column at the temperature of distillation of said fuel, introducing at the bottom of said column a combustible gas incapable of producing a substantial amount of oxidation with the incandescent coke descending from the said distillation zone, for carrying up the heat of the said incandescent coke, said gas being introduced at the ambient temperature, and introducing in a continuous and adjustable manner a combustion supporting gas in said distillation zone of said fuel column, substantially at the point where the distillation is substantially completed, for the purpose of producing therein a partial combustion and for raising the temperature to the value required for the distillation of said fuel.

3. A method of distillation of solid fuels for generating gases, comprising causing a fuel charge to descend in the form of a column maintaining a portion of this column intermediate its ends at the temperature of distillation of said fuel, introducing at the bottom of this column a combustible gas incapable of producing a substantial amount of oxidation with the incandescent coke descending from said distillation zone, for carrying up the heat of said incandescent coke, said gas being introduced at the ambient temperature, and introducing in a continuous and adjustable manner a preheated combustion supporting gas in the said distillation zone of said fuel column substantially at the point where the distillation is substantially completed, for the purpose of producing a partial combustion and for raising the temperature to the value required for the distillation of the fuel.

4. A method of distillation of solid fuels for generating gases, comprising causing a fuel charge to descend in the form of a column distilling the descending fuel charge, giving the column a cross section increasing from top to bottom with a sudden change in an intermediate point substantially where the distillation of the fuel is substantially completed, introducing at the bottom of said column a combustible gas incapable of producing a substantial amount of oxidation with the incandescent coke descending from the said distillation zone, for carrying up the heat of the said incandescent coke, said gas being introduced at the ambient temperature, and introducing in a continuous and adjustable manner a combustion supporting gas in the portion of said column of said sudden change of cross section for producing therein a partial combustion and for raising the temperature to the value required for the distillation of the fuel.

5. A method of distillation of solid fuels for generating gases, comprising causing a fuel charge to descend in the form of a column, distilling the descending fuel charge by maintaining a portion of this column intermediate its ends at the temperature of distillation of said fuel, introducing at the bottom of said column a combustible gas incapable of producing a substantial amount of oxidation with the incandescent coke descending from said distillation zone, for carrying up the heat of the said incandescent coke, said gas being introduced at the ambient temperature, and introducing in a continuous and adjustable manner a combustion supporting gas in said distillation zone of said column, substantially at the point where the distillation is substantially completed, for the purpose of producing therein a partial combustion and for raising the temperature to the value required for the distillation of said fuel, means being provided for an electric heating of said distillation zone.

Signed at Milan, Italy, this 13th day of August A. D. 1920.

Ing. REMO DE BARTOLOMEIS.
Ing. ROMOLO DE BARTOLOMEIS.